(No Model.) 2 Sheets—Sheet 1.

H. D. WHEATLEY.
MUSIC LEAF TURNER.

No. 260,071. Patented June 27, 1882.

WITNESSES:

INVENTOR.

(No Model.) 2 Sheets—Sheet 2.
H. D. WHEATLEY.
MUSIC LEAF TURNER.
No. 260,071. Patented June 27, 1882.
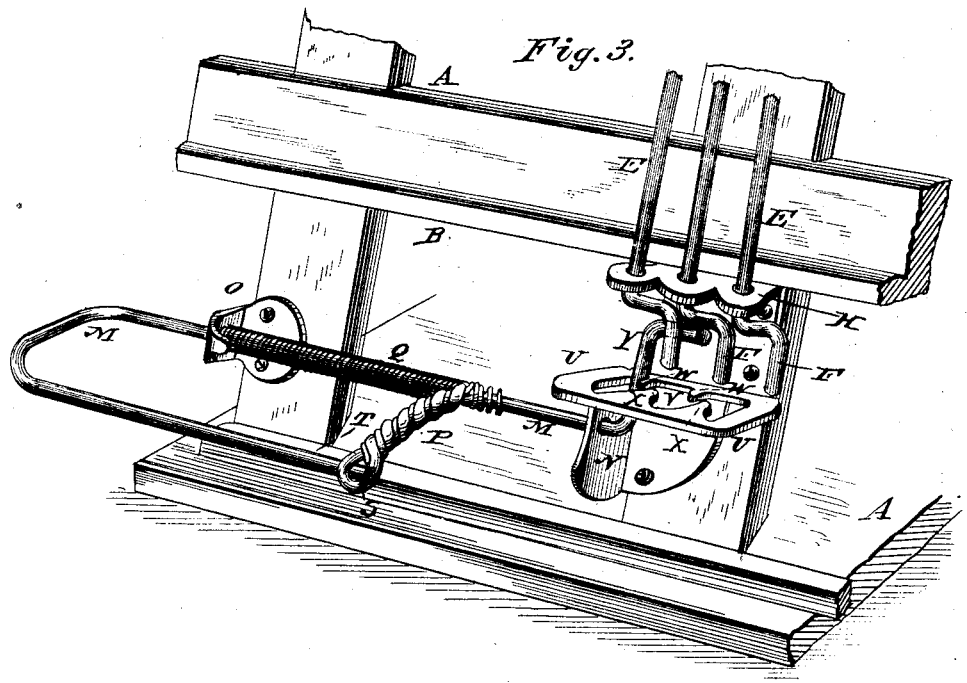
Fig. 3.
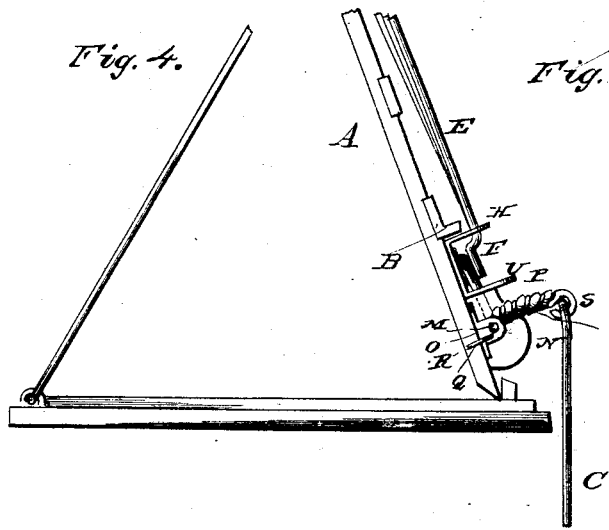
Fig. 4. Fig. 5.
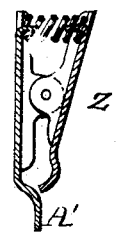
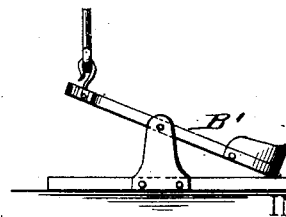
WITNESSES:
Fred. G. Dieterich
P. T. Dieterich
INVENTOR.
H. D. Wheatley,
by C. A. Snow & Co.
ATTORNEYS.

UNITED STATES PATENT OFFICE.

HARRY D. WHEATLEY, OF CENTREVILLE, OHIO.

MUSIC-LEAF TURNER.

SPECIFICATION forming part of Letters Patent No. 260,071, dated June 27, 1882.

Application filed March 20, 1882. (No model.)

*To all whom it may concern:*

Be it known that I, HARRY D. WHEATLEY, of Centreville, in the county of Montgomery and State of Ohio, have invented certain new and useful Improvements in Music-Holders and Leaf-Turners; and I do hereby declare that the following is a full, clear, and exact description of the invention, which will enable others skilled in the art to which it appertains to make and use the same, reference being had to the accompanying drawings, which form a part of this specification.

Figure 1:
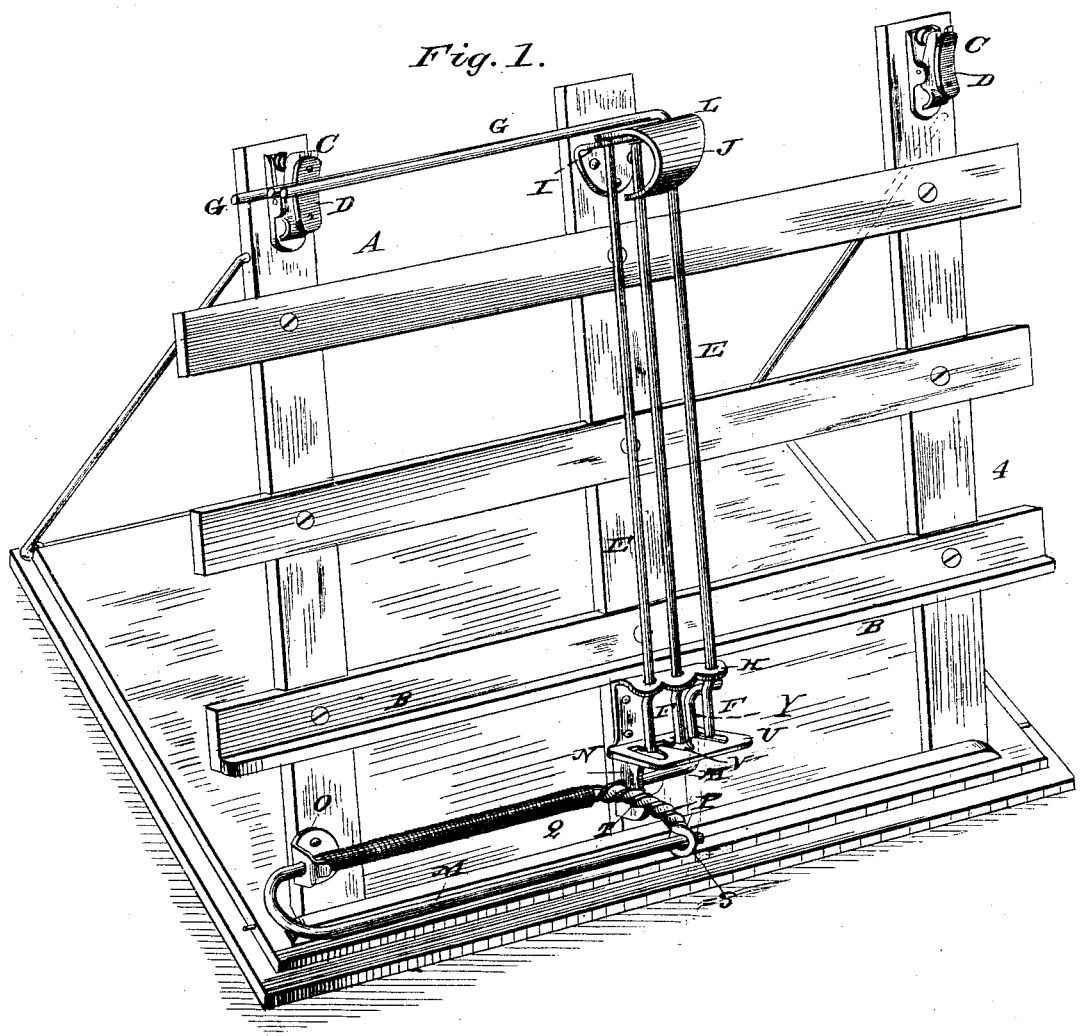
Figure 2:
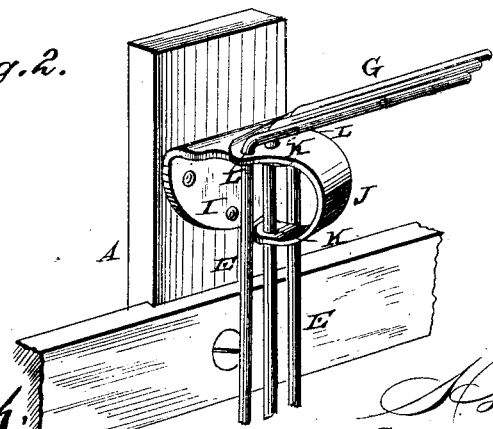

Figure 1 is a perspective view of my improved music-holder and leaf-turner. Fig. 2 is a detail view of the hinge at the upper end of the leaf-turning fingers. Fig. 3 is a detail view, on an enlarged scale, of the operating mechanism. Fig. 4 is a view illustrating a modification by which the device may be operated by means of a treadle, and Fig. 5 is a sectional view of one of the holding-clamps Z.

Corresponding parts in the several figures are denoted by like letters of reference.

This invention relates to music-holders and leaf-turners; and it consists in certain improvements in the construction of the same, which will be hereinafter fully described, and particularly pointed out in the claims.

In the drawings hereto annexed, A represents the frame or rack of the music-stand, which is provided at or near its lower edge with a ledge or flange, B, to support the music while being adjusted in the holder. The rack A is provided at its upper corners with spring-clamps C, to hold the outer leaves of the sheet-music, or, when a book is used, the covers of such book, together with the leaves which it is not desired to use. Said clamps are provided on their outer sides with cushions D, of india-rubber, to receive and deaden the shock caused by turning over the leaves.

The leaf-turners consist of shafts E, provided at their lower ends with cranks F and at their upper ends with horizontal arms or fingers G, at right angles to said shafts. The lower ends of the shafts E are journaled beside each other in suitable bearings in a flange, H, at the lower edge of the rack. A flange, I, at or near the upper edge of the rack, forms the upper bearing for the central shaft E, (three such shafts or leaf-turners being shown in the drawings hereto annexed.)

J is a curved plate having openings or perforations K K, by which it is mounted upon the upper end of the central shaft E, and provided with lips or flanges L L, which form bearings for the upper ends of the outer shafts E. By this arrangement the upper ends of the outer shafts will rock or yield, so that the arms G will at all times fit evenly on top of each other.

The leaf-turning mechanism consists of a rod or shaft, M, arranged horizontally in suitable bearings in flanges N O at the lower edge of the rack A. The rod M is provided with an arm or crank, P, at right angles thereto, formed by looping or doubling and twisting a portion of said rod, and intertwisting therewith one end of a coiled spring, Q, adjusted upon said rod between the arm P and the outer flange or bearing, O. The latter has an opening, R, through which the outer end of the spring Q is drawn, and by drawing the said outer end out for any required distance the tension of the spring may be regulated.

The projecting end of the spring may be secured by bending it around the flange O. By this arrangement of the spring it serves not only to force the rod M in an inward direction toward the flange N, but also to force the arm P in an upward direction. The outer end of the rod M is curved in a forward and inward direction, and its end is adjusted in a loop, S, at the end of the twisted arm P, thus forming a handle, T, by which this rod or "trigger," as it may be appropriately called, may be conveniently manipulated.

U is a flange secured near the lower edge of rack A, below the bearing-flange H of the leaf-turners. Said flange has a slot, V, from the inner side of which two beveled studs, W W, project in an outward direction, while from its outer side two beveled tongues, X X, project inwardly, as shown. The inner end of the rod M is bent to form a crank, Y, which projects into the slot V, so as to engage with and operate the leaf-turners by means of their cranks F, as will be presently described.

The sheet-music or leaves to be turned are to be secured to the horizontal arms G of the leaf-turners E by means of spring-clamps Z, having curved tips, which simply embrace the arms G and the upper edges of the leaves, which are thus secured without injury to the paper. The rear sides of the clamps have downward extensions A', which serve to retain the clamps in a position in a line with the sheets.

The operation of my invention is as follows: The leaves having been attached to the arms G of the turners, the latter are all turned to the right, thus leaving the first pages of the music exposed. Previous to this, however, the trigger must be adjusted, which is done by drawing the rod M back against the tension of the spring until the crank Y rests or bears against the left-hand stud W, where it is held by the spring, forcing the arm P in an upward, and consequently the crank Y in a downward, direction. To operate the device the handle T is depressed, thus raising the crank Y, which thereby engages the crank F of the first turner E, which is thus rapidly turned. The tension of spring Q meantime forces the rod M in an inward direction to the right until crank Y strikes the first beveled tongue X, which, when pressure upon the handle T is released, guides the crank Y downward until it bears against the second stud W, where it remains at rest. By repeating the operation the second leaf is turned, and the crank Y is guided down to the edge of slot V, with which it remains in contact when manipulated to turn the third leaf.

The construction of my invention may be modified by using two or more sets of leaf-turners and correspondingly increasing the length of the slot V and the number of studs W and tongues X. When but a single set is used it may consist of one or more turners.

When the device is to be operated by a treadle, as shown in Fig. 4, where the treadle is denoted by letter B', the handle T may be omitted and the connecting-rod C' simply hooked in the loop S of arm P, as shown.

Having thus described my invention, I claim and desire to secure by Letters Patent of the United States—

1. In a music-leaf turner, the combination, with suitable leaf-turning mechanism, of the rack A, having ledge B, and provided at its upper corners with clamps C, having cushions D, as set forth.

2. The combination of the central leaf-turner, having its ends journaled in permanent bearings, with the outer leaf-turners, having their lower ends journaled permanently beside the central one and their upper ends in the side wings or flanges of a plate journaled upon the upper end of the central leaf-turner, as set forth.

3. The trigger consisting of the rod M, mounted in flanges N O and having crank Y, in combination with the spring Q, secured to one of said flanges at one end, and having its other end intertwisted with an arm, P, formed by twisting a portion of rod M, as set forth.

4. The rod M, having twisted arm P, formed with the loop S, to receive the curved outer end of said rod, thus forming a handle, T, as set forth.

5. The combination, with the leaf-turners, constructed and arranged as described, of the trigger M P Y Q and the flange U, having slot V, provided with studs W and tongues X, as set forth.

In testimony that I claim the foregoing as my own I have hereto affixed my signature in presence of two witnesses.

HARRY DUNBAR WHEATLEY.

Witnesses:
RICHARD T. WHEATLEY,
MICHAEL J. SWADENER.